United States Patent [19]
Damron et al.

[11] Patent Number: 5,754,887
[45] Date of Patent: May 19, 1998

[54] SYSTEM FOR LIMITING ACCESS OF PLURALITY OF REQUESTS TO PERIPHERAL BUS BY HALTING TRANSMISSION TO PARTICULAR PERIPHERAL DEVICES AND RESUMING TRANSMISSION AFTER SECOND PREDETERMINED TIME PERIOD EXPIRATION

[75] Inventors: Timothy Michael Damron, Austin; Michael Edward Lyons; Leslie James Record, both of Round Rock, all of Tex.

[73] Assignee: International Business Machines Corporation, Armonk, N.Y.

[21] Appl. No.: 472,361

[22] Filed: Jun. 7, 1995

[51] Int. Cl.$^6$ .................... G06F 13/14; G06F 15/16
[52] U.S. Cl. .............. 395/859; 395/297; 395/879; 395/557
[58] Field of Search ............ 395/182.1, 182.09, 395/287, 292, 297, 859, 860, 878, 879, 557

[56] References Cited

U.S. PATENT DOCUMENTS

| | | |
|---|---|---|
| 4,030,075 | 6/1977 | Barlow ................... 340/172.5 |
| 4,257,095 | 3/1981 | Nadir ..................... 395/299 |
| 4,561,092 | 12/1985 | Shaver .................... 370/89 |
| 4,719,569 | 1/1988 | Ludemann et al. ........ 395/729 |
| 4,849,936 | 7/1989 | Mizutani ................ 365/189.01 |
| 4,872,110 | 10/1989 | Smith et al. .............. 364/200 |
| 4,987,529 | 1/1991 | Craft et al. .............. 364/200 |
| 5,016,167 | 5/1991 | Nguyen et al. ........... 364/200 |
| 5,031,089 | 7/1991 | Liu et al. .............. 395/200.06 |
| 5,101,479 | 3/1992 | Baker et al. .............. 395/325 |
| 5,432,926 | 7/1995 | Citron et al. ........... 395/182.02 |
| 5,530,872 | 6/1996 | Smeltzer et al. .......... 395/733 |

*Primary Examiner*—Thomas C. Lee
*Assistant Examiner*—Rehana Perveen
*Attorney, Agent, or Firm*—Brian F. Russell; Andrew J. Dillon

[57] ABSTRACT

A method and system are disclosed for managing multiple requests issued by a requester to a number of peripheral devices coupled to a peripheral bus within a data processing system. A request issued by the requestor which specifies a particular operation to be performed is transmitted to a selected peripheral device vice the peripheral bus. In response to performance of the particular operation by the selected peripheral device within a first predetermined time period, successful completion of the request is reported to the requestor. In response to a failure of the selected peripheral device to perform the particular operation within the first predetermined time period, access to the peripheral bus by the multiple requests is limited. Thereafter, in response to a failure of the selected peripheral device to perform the particular operation within a second predetermined time period, a request timeout error is reported to the requester. However, in response to performance of the particular operation by the selected peripheral device within the second predetermined time period, successful completion of the request is reported to the requester. Thus, utilizing the present invention, request timeout errors due to peripheral bus saturation are minimized.

20 Claims, 4 Drawing Sheets

SYSTEM FOR LIMITING ACCESS OF PLURALITY OF REQUESTS TO PERIPHERAL BUS BY HALTING TRANSMISSION TO PARTICULAR PERIPHERAL DEVICES AND RESUMING TRANSMISSION AFTER SECOND PREDETERMINED TIME PERIOD EXPIRATION

BACKGROUND OF THE INVENTION

1. Technical Field

The present invention relates in general to a method and system for data processing and in particular to a method and system within a data processing system for managing a plurality of requests transmitted to a number of peripheral devices via a peripheral bus. Still more particularly, the present invention relates to an improved method and system within a data processing system for managing a plurality of requests transmitted to a number of peripheral devices via a peripheral bus which enable low priority peripheral devices to complete requests during periods of peripheral bus saturation.

2. Description of the Related Art

Many conventional data processing systems are equipped with expansion facilities, such as a Small Computer System Interface (SCSI), which enable a user to attach peripheral device, such as hard disk drives and printers, to the data processing systems. Under the SCSI-2 standard adopted by the American National Standards Institute (ANSI), up to sixteen addressable devices, including a SCSI adapter, can be connected to a host data processing system. Peripheral devices connected to the host data processing system through the SCSI adapter communicate with one another via a SCSI bus formed by daisy-chaining the peripheral devices. Like expansion buses, such as the Microchannel Bus developed by International Business Machines Corporation, the SCSI bus enables attached peripheral devices to communicate with one another independently of the system bus of the host data processing system.

Each device attached to a SCSI bus is assigned a SCSI ID from zero through fifteen, which serves as both an address and a priority. In order to ensure compatibility with the SCSI-1 standard, which allows only eight addressable devices, SCSI-2 addresses range in descending priority from 7–0 and 15–8. SCSI ID 7, the highest priority, is typically reserved for the SCSI adapter, which is also called the initiator. As the highest priority device on the SCSI bus, the initiator determines which operations are performed on the SCSI bus by the targets (i.e., the attached peripheral devices).

To initiate an operation by one of the targets, the operating system executing within the host data processing system transmits a message containing the parameters of the desired operation to a device driver program. The device driver utilizes the parameters to build a request that specifies a SCSI command and a timeout period in which the SCSI command is to be completed. The device driver then transmits the request across the system bus to the initiator, which arbitrates for control of the SCSI bus.

Once the initiator gains ownership of the SCSI bus, the initiator issues the SCSI command to the selected target. The selected target is then granted control of the bus in order to perform the operation specified by the SCSI command. Depending upon the type of SCSI command and the performance characteristics of the selected target, the selected target may release the bus while preparing to perform the requested operation. If the target releases the bus, the target must arbitrate for control of the SCSI bus to return requested data or report completion of the requested operation. For example, if a host requests a segment of data stored on a hard disk drive target, the hard disk drive will typically release the SCSI bus while the read/write head is positioned over the sector containing the requested data in order to promote maximum utilization of the SCSI bus. Since the initiator can transmit additional SCSI commands to other targets during the period that the first target has released the bus, contention between the targets can arise when multiple targets simultaneously arbitrate for the SCSI bus.

When SCSI bus traffic is low, bus contention poses no performance problems since even the lowest priority device can gain control of the bus during periods of relative inactivity on the SCSI bus. However, in data processing systems having multiple processors, a number of targets, and faster targets with large queues and caches that decrease target latency, it is possible, and indeed likely, that targets assigned low priorities will be unable to gain control of the SCSI bus to complete the requested operation due to SCSI bus saturation. Since the SCSI adapter must report the completion or failure of each requested operation to the device driver after the timeout period specified by the operating system has elapsed, the inability of low priority targets to obtain control of the SCSI bus not only causes the targets to be inaccessible to the host, but also generates erroneous timeout error messages.

Consequently, it would be desirable to provide a method and system within a data processing system for managing a plurality of requests issued to a number of peripheral devices, where the method and system enable low priority peripheral devices to complete requests when the peripheral bus is saturated.

SUMMARY OF THE INVENTION

It is therefore one object of the present invention to provide an improved method and system for data processing.

It is another object of the present invention to provide an improved method and system within a data processing system for managing a plurality of requests transmitted to a number of peripheral devices via a peripheral bus.

It is yet another object of the present invention to provide an improved method and system within a data processing system for managing a plurality of requests transmitted to a number of peripheral devices via a peripheral bus which enable low priority peripheral devices to complete requests during periods of peripheral bus saturation.

The foregoing objects are achieved as is now described. A method and system are disclosed for managing multiple requests issued by a requester to a number of peripheral devices coupled to a peripheral bus within a data processing system. A request issued by the requestor which specifies a particular operation to be performed is transmitted to a selected peripheral device via the peripheral bus. In response to performance of the particular operation by the selected peripheral device within a first predetermined time period, successful completion of the request is reported to the requester. In response to a failure of the selected peripheral device to perform the particular operation within the first predetermined time period, access to the peripheral bus by the multiple requests is limited. Thereafter, in response to a failure of the selected peripheral device to perform the particular operation within a second predetermined time period, a request timeout error is reported to the requester.

However, in response to performance of the particular operation by the selected peripheral device within the second predetermined time period, successful completion of the request is reported to the requester. Thus, utilizing the present invention, request timeout errors due to peripheral bus saturation are minimized.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
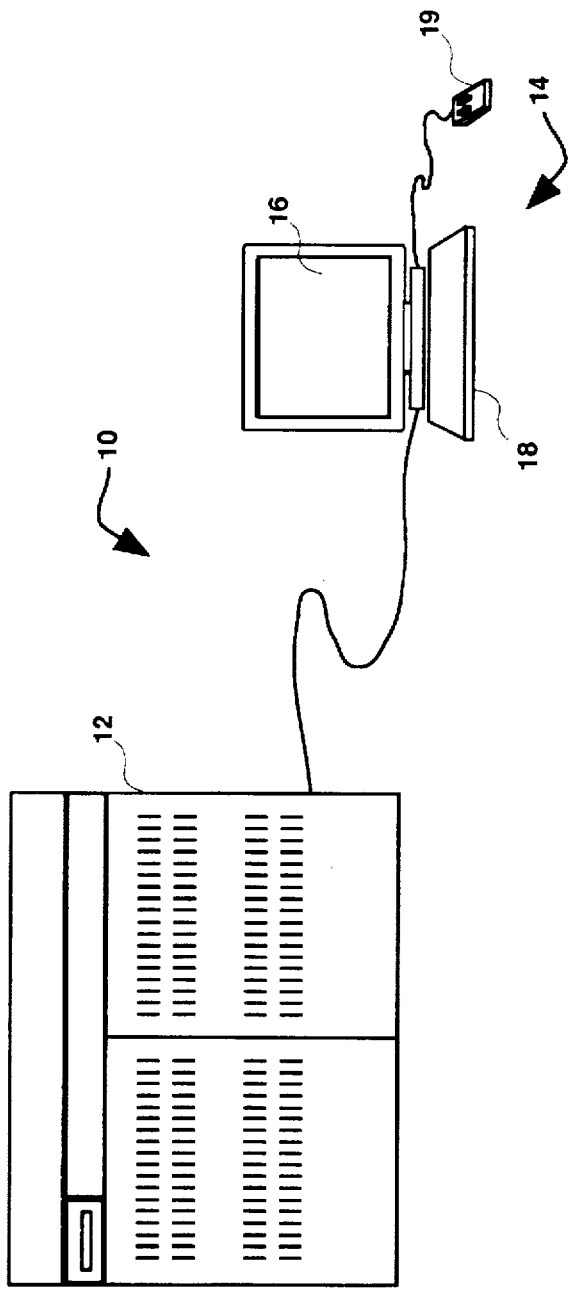
FIG. 1 illustrates a preferred embodiment of a data processing system which employs the method and system of the present invention.

With reference now to the figures and in particular with reference to FIG. 1, there is illustrated a preferred embodiment of a multiprocessor data processing system which employs the method and system of the present invention. As illustrated, data processing system 10 comprises system unit 12 and one or more local nodes 14, which include display device 16, keyboard 18, and mouse 19. As is well-known to those skilled in the art, a user inputs data to system unit 12 utilizing keyboard 18, mouse 19 or other suitable input device. System unit 12 outputs data to a user via display device 16.

Figure 2:
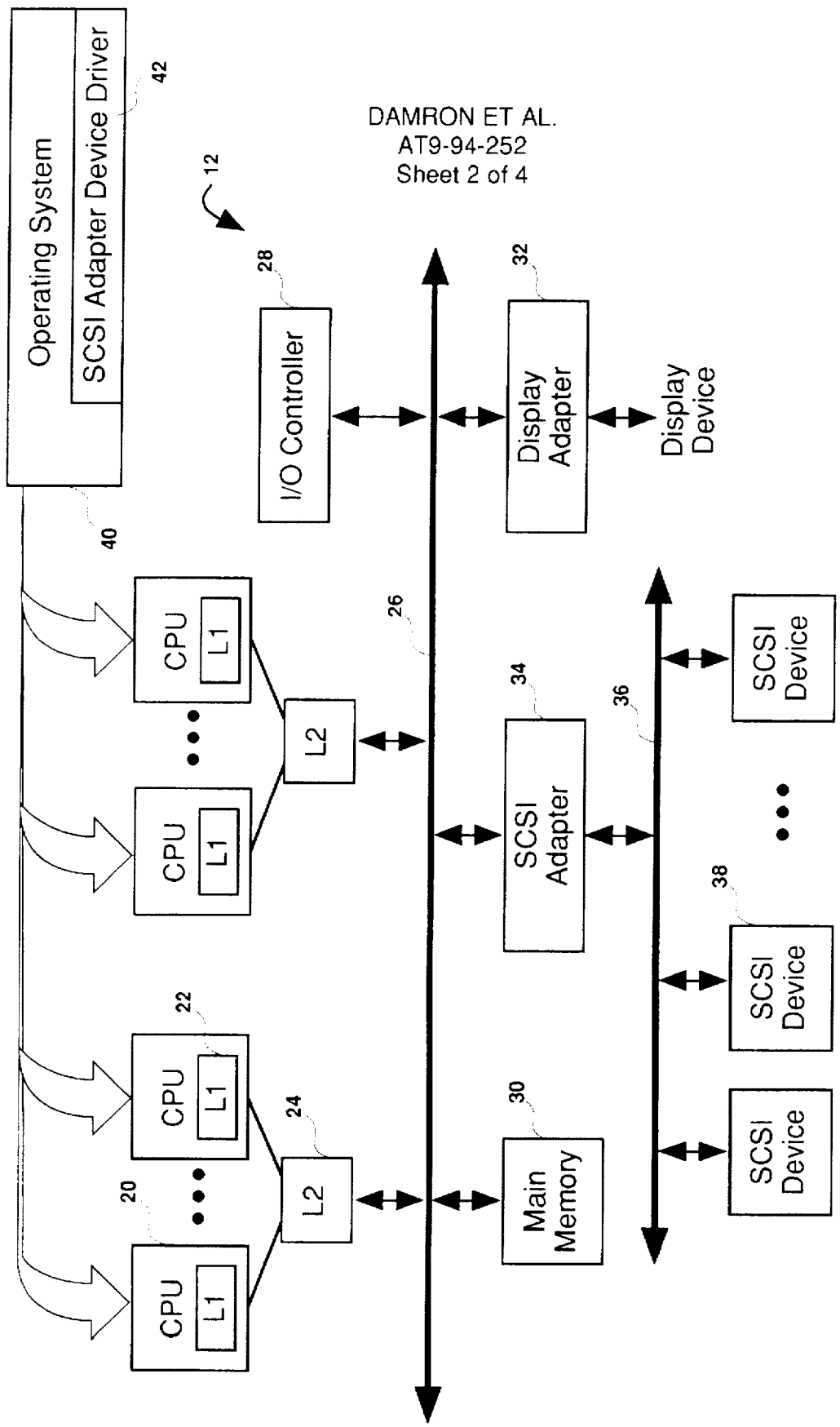
FIG. 2 depicts a block diagram o the system unit of the data processing system illustrated in FIG. 1.

Referring now to FIG. 2, there is depicted a block diagram of system unit 12, which is preferably a superscalar multi-processor data processing system, such as the IBM RISC System/6000. System unit 12 includes a number of CPUs 20, which each include an on-board level one (L1) cache 22. In a preferred embodiment of the present invention, CPUs 20 comprise one of the PowerPC™ RISC microprocessors available from International Business Machines Corporation. Each L1 cache 22 comprises a small amount of high speed memory which stores a local copy of data utilized by its associated CPU 20. When data requested by a CPU 20 is not resident within its associated L1 cache 22, CPU 20 will attempt to load the requested data from an associated L2 cache 24 which comprises a second level within the memory hierarchy. As illustrated, each L2 cache 24 may be shared by multiple CPUs 20. When data requested by CPU 20 is not resident within its associated L1 cache 22 or L2 cache 24, the data request is forwarded to main memory 30, which is accessible to each CPU 20 via system bus 26. As will be understood by those skilled in the art, main memory 30 may include one or more individual modules of physical memory as well as secondary storage, such as a DASD file.

System unit 12 also includes I/O controller 28 and display adapter 32. I/O controller 28 is utilized to receive user inputs from keyboard 18 or mouse 19 and thereafter transmit the inputs via system bus 26 to one of CPUs 20 for processing. Display adapter 32 drives display device 16 in a conventional manner in response to data received from one or more of CPUs 20.

According to the present invention, system unit 12 also includes SCSI adapter 34, which preferably implements the SCSI-2 protocol defined by the American National Standards Institute (ANSI). In this preferred embodiment, up to fifteen SCSI devices 38 may be coupled to SCSI adapter 34 via SCSI bus 36. According to the SCSI-2 protocol, each SCSI device 38 is assigned a SCSI ID between zero and fifteen with SCSI ID 7 having the highest priority and SCSI ID 8 the lowest. Control of SCSI bus 36 is determined by the SCSI-2 arbitration protocol, which awards ownership of SCSI bus 36 to the highest priority device which arbitrates for SCSI bus 36.

The operation of system unit 12 is directed by a suitable operating system 40, such as AIX (Advanced Interactive eXecutive), running on each of CPUs 20. As is well-known to those skilled in the art, operating system 40 provides an interface between application software and the resources of system unit 12. Accordingly, operating system 40 includes SCSI adapter device driver 42, which facilitates communication between operating system 40 and SCSI adapter 34, as well as other device drivers (not illustrated) to support I/O controller 28 and display adapter 32.

Figure 3A:
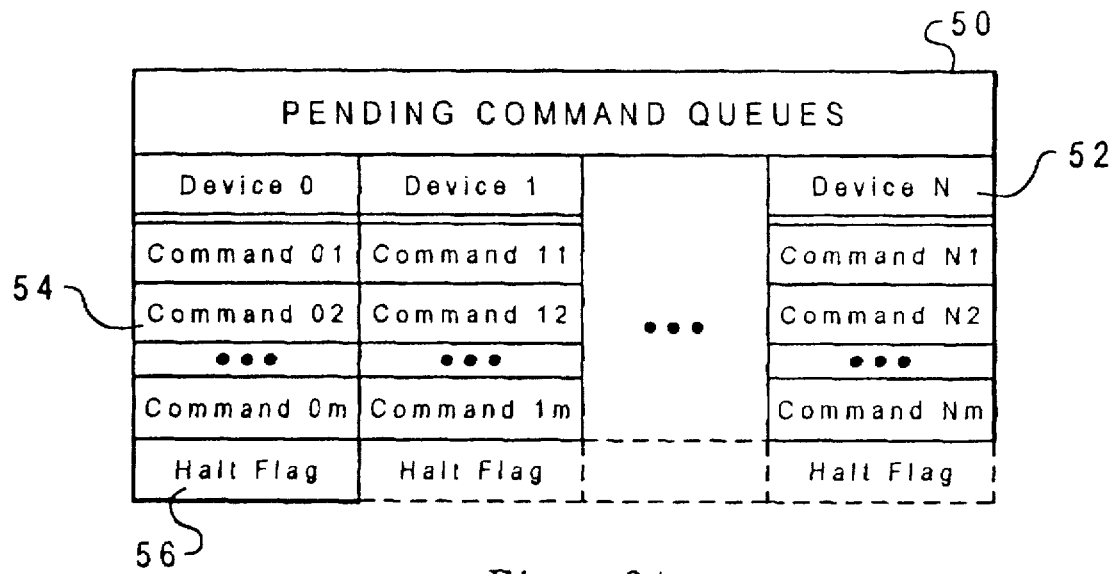
FIG. 3 illustrates a preferred embodiment of the pending and active command queues maintained by SCSI adapter device driver software according to a preferred embodiment of the present invention.
Figure 3B:
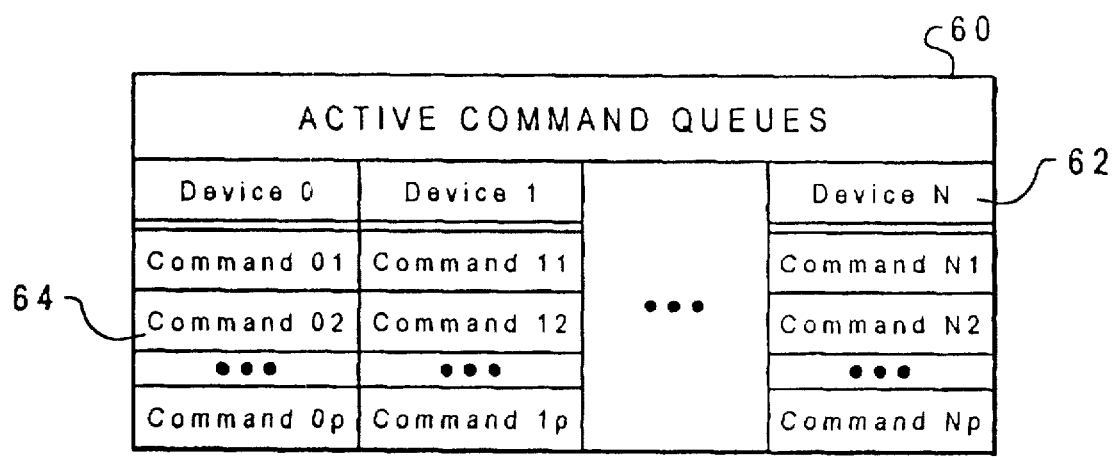

With reference now to FIG. 3, there is illustrated a preferred embodiment of two data structures maintained by, SCSI adapter device driver 42 within the memory hierarchy (L1 cache 22, L2 cache 24, or main memory 30) of system unit 12 which are utilized to manage a number of operating system requests directed to SCSI devices 38. As illustrated, pending data structure 50 comprises N+1 pending command queues 52, which are each associated with one of the N+1 SCSI devices 38 coupled to SCSI bus 36. As noted above, in a preferred embodiment of the present invention in which SCSI adapter 34 implements the SCSI-2 protocol, N designates a SCSI ID between 0 and 15. Each pending command queue 52 includes m pending command entries 54, which each store an operating system request to be issued to the SCSI device 38 (target) associated with that pending command queue 52. In addition to a SCSI command to be performed by the target, the request specifies a target SCSI ID, a number of data bytes to be transferred in response to the SCSI command, whether the data transfer will be synchronous or asynchronous, a command timeout period, and other control information necessary to complete the SCSI command.

Pending data structure 50 also includes one or more halt flags 56. In a first embodiment of the present invention, pending data structure 50 includes a single halt flag 56. In the first embodiment when halt flag 56 is set, all of pending command queues 52 are halted, that is, pending command entries 54 may not be removed from pending command queues 52 and placed upon active command queues 62, which are described below. In a second embodiment of the present invention, pending command queues 52 are each associated with one of N+1 halt flags 56, as indicated in FIG. 3 by dashed-line illustration. In the second embodiment, each of the N+1 halt flags 56 comprises an integer counter, which when set by incrementing the counter to a value greater than 0, halts only its associated pending command queue 52; a halt flag 56 is reset by decrementing the counter to a value of 0. As will become apparent, a decision whether to implement the first or the second embodiment of the present invention reflects a software design tradeoff between the additional complexity of SCSI adapter device driver 42 required to support independent operation of pending command queues 52 versus the enhanced performance which independent operation of pending command queues 52 provides.

In addition to pending data structure 50, SCSI adapter device driver 42 also maintains active data structure 60, which comprises N+1 active command queues 62, which each include p active command entries 64. Active command entries 64 store operating system requests that have been issued to targets, but have not completed.

An overview of the operation of pending data structure 50 and active data structure 60 is as follows. When operating system 40 requires the performance of an operation by a target SCSI device 38, operating system 40 communicates a request to SCSI adapter device driver 42, which places the request on the tail of the pending command queue 52 associated with the target. Each pending command queue 52 operates as a first-in, first-out queue controlled by the state of its associated halt flag 56. Thus, when a operating system request is issued to a target from the head of pending command queue 52, the pending command entry 54 which stores the issued request is removed from the pending command queue 52 associated with the target and is placed on the corresponding active command queue 60 until the SCSI command specified by the request has completed. A more detailed description of the operation of pending data structure 50 and active data structure 60 is provided below in reference to FIG. 4.

Figure 4:
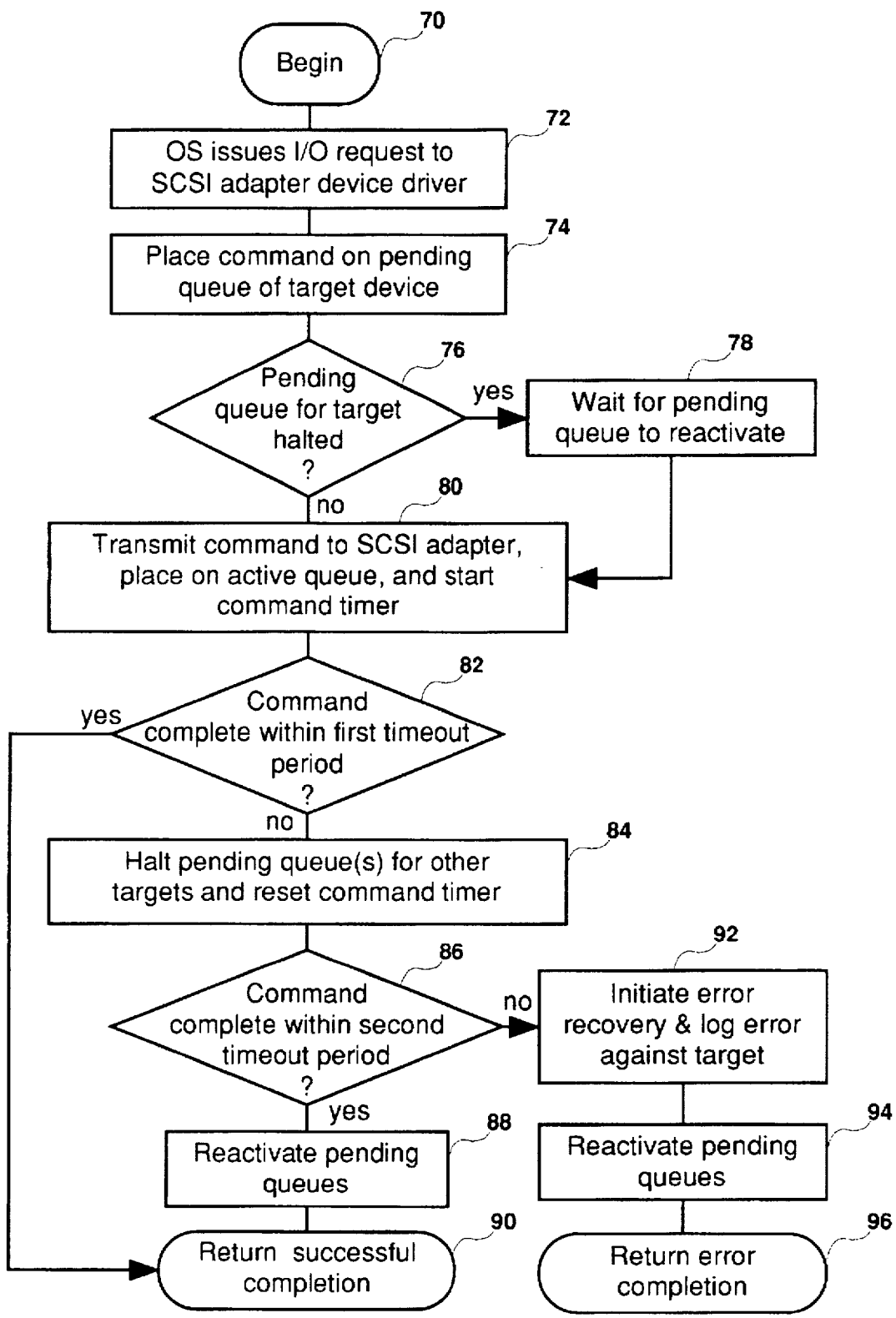
FIG. 4 is a flowchart depicting the method utilized by the present invention to manage a plurality of requests transmitted to a number of peripheral devices via a peripheral bus.

Referring now to FIG. 4, there is depicted a flowchart of the method utilized by the present invention to process operating system requests directed to SCSI devices 38. As illustrated, the process begins at block 70 and thereafter proceeds to block 72, which depicts operating system 40 communicating a request, for example a request for data residing on a peripheral hard disk drive, to SCSI adapter device driver 42. As described above, the request specifies the SCSI ID of a target SCSI device 38, a SCSI command to be performed by the target, a number of bytes within the I/O transfer, whether the transfer will be synchronous or asynchronous, a command timeout period, and other required control information. The process then proceeds to block 74, which illustrates SCSI adapter device driver 42 placing the request on the pending command queue 52 associated with the target SCSI device 38.

Next, at block 76, a determination is made whether the pending command queue 52 associated with the target SCSI device 38 has been halted. In the first embodiment of the present invention, which utilizes only a single halt flag 56, each pending command queue 52 is halted when halt flag 56 is set. In the second embodiment of the present invention in which pending data structure 50 includes N+1 halt flags 56, a particular pending command queue 52 is halted only when its associated halt flag 56 is set to an integer value greater than 0. If a determination is made at block 76 that pending command queue 52 associated with target SCSI device 38 has been halted, the operation of pending command queue 52 is suspended until halt flag 56 is cleared (set to 0 in the second embodiment), as illustrated at block 78. While pending command queue 52 is halted, additional pending command entries 54 may be added to the tail of pending command queue 52, but no pending command entries 54 may be removed.

Thereafter, the process proceeds from either block 76 or block 78 to block 80, which illustrates SCSI adapter device driver 42 removing the pending command entry 54 stored at the head of pending command queue 52, repackaging the request into the hardware-dependent format utilized by SCSI adapter 34, and transmitting the request to SCSI adapter 34. Although the issuance of requests from pending command queues 52 may be regulated in a variety of ways as a matter of design choice, in a preferred embodiment of the present invention, SCSI adapter device driver 42 issues a SCSI command from the head of a particular pending command queue 52 in response to either the addition of a pending command entry 54 to the tail of a pending command queue 52 or the completion of a previously issued request. At block 80, SCSI adapter device driver 42 also places the operating system request on the active command queue 62 associated with the target and starts a command timer initialized to a first command timeout period specified by operating system 40. In a preferred embodiment of the present invention, the command timer utilized by SCSI adapter device driver 42 is accessed by submitting a service request specifying the duration of the first timeout period to the operating system kernel; however, those skilled in the art will appreciate that a variety of hardware and software timing mechanisms may be implemented.

After the request is transmitted to SCSI adapter 34 via system bus 26, SCSI adapter 34 arbitrates for ownership of SCSI bus 36. Since SCSI adapter 34 is assigned SCSI ID 7, even when contention between SCSI devices 38 arises, SCSI adapter 34 obtains ownership of SCSI bus 36 in response to arbitrating for SCSI bus 36. SCSI adapter 34 then transmits the SCSI command to target SCSI device 38 and releases ownership of the bus to target SCSI device 38. In general, target SCSI device 38 releases ownership of SCSI bus 36 after the target acknowledges acceptance of the SCSI command in order to facilitate maximum utilization of SCSI bus 36. As described above, target SCSI device 38 must arbitrate for ownership of SCSI bus 36 to complete the SCSI command by transmitting requested data and/or an acknowledgement of completion of the specified operation. In prior art systems, when SCSI bus 36 is saturated and target SCSI device 38 has a low priority, target SCSI device 38 may be unable to regain ownership of SCSI bus 36.

Returning to block 82 of FIG. 4, a determination is made by SCSI adapter device driver 42 whether the SCSI command completed within the timeout period specified by operating system 40. If the command completes within the specified timeout period, the process proceeds to block 90, which illustrates reporting successful completion of the SCSI command to operating system 40. However, if the SCSI command does not complete before the first command timeout period elapses, the process proceeds to block 84, which depicts halting selected pending command queues 52 by setting one or more halt flags 56. In the first embodiment of the present invention, the single halt flag 56 is set, which halts all N+1 pending command queues 52. In the second embodiment of the present invention, block 84 illustrates incrementing selected halt flags 56 which control pending command queues 52 corresponding to SCSI devices 38 having a higher priority than the target. Setting halt flag(s) 53 associated with pending command queues 52 does not inhibit the completion of SCSI commands placed within active command queues 62, but only prevents transmission of additional SCSI commands to SCSI devices 38.

In either the first or second embodiments of the present invention, the command timer is reset at block 84 for a second timeout period. The second timeout period is preferably a lengthy interval (e.g., 5 s) as compared with typical response times of SCSI devices 38 in order to ensure that the SCSI command will have ample time to complete. The SCSI command that timed out at the end of the first timeout period will complete during the second timeout period absent an error since active commands directed to higher priority targets will have an opportunity to complete, thereby freeing SCSI bus 36 for use by low priority targets.

Next, the process proceeds to block 86, which depicts determining whether the SCSI command completed within the second timeout period. If the SCSI command completes before the second timeout period elapses, the process proceeds to block 88. In the first embodiment of the present invention, block 88 illustrates reactivating all of pending command queues 52 by clearing halt flag 56. In the second embodiment of the present invention, each halt flag 56 associated with a SCSI device 38 having a higher priority than the target is decremented at block 88. Thus, pending command queues 52 associated with higher priority SCSI devices 38 are reactivated if only a single SCSI command addressed to a lower priority target has timed out. However, if multiple SCSI commands addressed to lower priority devices have timed out, decrementing halt flags 56 at block 88 merely reduces the number of SCSI commands which must complete before pending command queues 52 are reactivated. Thereafter, successful completion of the SCSI command is reported to operating system 40 at block 90.

Returning to block 86, if the SCSI command does not complete before the second timeout period elapses, the process proceeds from block 86 to block 92, which illustrates initiating error recovery and logging an error against target SCSI device 38. Although the implementation of error recovery is system dependent, error recovery measures may include a soft reset of target SCSI device 38, and failing acknowledgement of the soft reset, a hard reset of SCSI bus 36. In a preferred embodiment of the present invention, initiating error recovery also clears commands from the active command queue 62 associated with target SCSI device 38. The process proceeds from block 92 to block 94, which, in the first embodiment of the present invention, depicts reactivating pending command queues 52 by clearing halt flag 56. In the second embodiment of the present invention, block 94 illustrates decrementing each halt flag 56 which controls a pending command queue 52 associated with a SCSI device 38 having a higher priority than the target. Thereafter, the process terminates at block 96 by reporting a command timeout error to operating system 40.

As has been described, the present invention provides an improved method and system for managing multiple requests directed to a number of peripheral devices coupled to a peripheral bus within a data processing system. In particular, the present invention enables a data processing system to eliminate command timeout errors due to peripheral bus saturation, thus enabling device errors to be efficiently detected. Although the present invention has been described with respect to a preferred embodiment of a data processing system that includes a number of SCSI devices which share a common SCSI bus, those skilled in the art will appreciate that the present invention may also be advantageously applied to other data processing systems which utilize a single resource shared by multiple prioritized devices.

While the invention has been particularly shown and described with reference to a preferred embodiment, it will be understood by those skilled in the art that various changes in form and detail may be made therein without departing from the spirit and scope of the invention.

We claim:

1. A method within a data processing system for managing a plurality of requests issued by a requester to selected peripheral devices among a plurality of peripheral devices coupled to a peripheral bus, said method comprising:

transmitting a request issued by said requester to a selected peripheral device among said plurality of peripheral devices via said peripheral bus, wherein said request specifies a particular operation to be performed;

in response to performance of said particular operation by said selected peripheral device within a first predetermined time period, reporting successful completion of said request to said requestor via said peripheral bus;

in response to a failure of said selected peripheral device to perform said particular operation within said first predetermined time period, limiting access to said peripheral bus by said plurality of requests;

thereafter, in response to a failure of said selected peripheral device to perform said particular operation within a second predetermined time period, reporting a request timeout error to said requestor;

in response to performance of said particular operation by said selected peripheral device within said second predetermined time period, reporting a successful completion of said request to said requestor, wherein request timeout errors due to peripheral bus saturation are minimized;

wherein said step of limiting access to said peripheral bus by said plurality of requests comprises halting transmission of said plurality of requests to particular ones of said plurality of peripheral devices during said second predetermined time period; and in response to performance of said particular operation by said selected peripheral device within said second predetermined time period or termination of said second predetermined time period, resuming transmission of said plurality of requests to said particular ones of said plurality of peripheral devices via said peripheral bus.

2. The method for managing a plurality of requests within a data processing system of claim 1, said data processing system further including a peripheral adapter coupled between said peripheral bus and a processor which executes system software that maintains a pending queue and an active queue for each of said plurality of peripheral devices, wherein each of said pending queues stores requests to be issued and each of said active queues stores requests that have been issued but have not completed, said method further comprising:

receiving a request at said system software which specifies said particular operation to be performed by said selected peripheral device;

placing said request within a pending queue associated with said selected peripheral device;

determining whether transmission of requests within said pending queue associated with said selected peripheral device has been halted;

in response to a determination that transmission of requests within said pending queue associated with said selected peripheral device has not been halted, transmitting said request to said peripheral adapter; and placing said request on an active queue associated with said selected peripheral device.

3. The method for managing requests within a data processing system of claim 2, wherein said steps of reporting successful completion of said request to said requestor comprise:

transmitting an indication from said peripheral adapter to said system software that said request has been performed;

removing said request from said active queue associated with said selected peripheral device; and resuming transmission of requests from each pending queue from which transmission of requests was halted.

4. The method for managing a plurality of requests within a data processing system of claim 1, wherein each of said plurality of peripheral devices is associated with a priority, and wherein said step of halting transmission of said plurality of requests to particular ones of said plurality of peripheral devices during said second predetermined time period comprises halting transmission of said plurality of requests to peripheral devices among said plurality of peripheral devices which have a higher priority than said selected peripheral device.

5. The method for managing a plurality of requests within a data processing system of claim 4, said data processing system further including a peripheral adapter coupled between said peripheral bus and a processor which executes system software that maintains a pending queue and an active queue for each of said plurality of peripheral devices, wherein each of said pending queues stores requests to be issued and each of said active queues stores requests that have been issued but have not completed, said method further comprising:

receiving a request at said system software which specifies a particular operation to be performed by said selected peripheral device;

placing said request within a pending queue associated with said selected peripheral device;

determining whether transmission of requests within said pending queue associated with said selected peripheral device has been halted;

in response to a determination that transmission of requests within said pending queue associated with said selected peripheral device has not been halted, transmitting said request to said peripheral adapter; and placing said request on an active queue associated with said selected peripheral device.

6. The method for managing requests within a data processing system of claim 5, wherein said steps of reporting successful completion of said request to said requester comprise:

transmitting an indication from said peripheral adapter to said system software that said request has been performed;

removing said request from said active queue associated with said selected peripheral device; and resuming transmission of requests from each pending queue from which transmission of requests was halted.

7. A system within a data processing system for managing a plurality of requests issued by a requester to selected peripheral devices among a plurality of peripheral devices coupled to a peripheral bus, said system comprising:

means for transmitting a request issued by said requestor to a selected peripheral device among said plurality of peripheral devices via said peripheral bus, wherein said request specifies a particular operation to be performed;

means for reporting successful completion of said request to said requester via said peripheral bus in response to performance of said particular operation by said selected peripheral device within a first predetermined time period;

means for limiting access to said peripheral bus by said plurality of requests in response to a failure of said selected peripheral device to perform said particular operation within said first predetermined time period;

means for thereafter reporting a request timeout error to said requester in response to a failure of said selected peripheral device to perform said particular operation within a second predetermined time period;

means for reporting a successful completion of said request to said requester in response to performance of said particular operation by said selected peripheral device within said second predetermined time period, wherein request timeout errors due to peripheral bus saturation are minimized;

wherein said means for limiting access to said peripheral bus by said plurality of requests comprises means for halting transmission of said plurality of requests to particular ones of said plurality of peripheral devices during said second predetermined time period; and means for resuming transmission of said plurality of requests to said particular ones of said plurality of peripheral devices via said peripheral bus in response to performance of said particular operation by said selected peripheral device within said second predetermined time period or termination of said second predetermined time period.

8. The system for managing a plurality of requests within a data processing system of claim 7, and further comprising:

a processor which executes system software that maintains a pending queue and an active queue for each of said plurality of peripheral devices, wherein each of said pending queues stores requests to be issued and each of said active queues stores requests that have been issued but have not completed;

a peripheral adapter coupled between said processor and said peripheral bus;

means for receiving a request at said system software which specifies said particular operation to be performed by said selected peripheral device;

means for placing said request within a pending queue associated with said selected peripheral device;

means for determining whether transmission of requests within said pending queue associated with said selected peripheral device has been halted;

means for transmitting said request to said peripheral adapter in response to a determination that transmission of requests within said pending queue associated with said selected peripheral device has not been halted; and means for placing said request on an active queue associated with said selected peripheral device.

9. The system for managing requests within a data processing system of claim 8, wherein each of said means for reporting successful completion of said request to said requester comprises:

means for transmitting an indication from said peripheral adapter to said system software that said request has been performed;

means for removing said request from said active queue associated with said selected peripheral device; and means for resuming transmission of requests from each pending queue from which transmission of requests was halted.

10. The system for managing a plurality of requests within a data processing system of claim 7, wherein each of said plurality of peripheral devices is associated with a priority, and wherein said means for halting transmission of said plurality of requests to particular ones of said plurality of peripheral devices during said second predetermined time period comprises means for halting transmission of said plurality of requests to peripheral devices among said plurality of peripheral devices which have a higher priority than said selected peripheral device.

11. The system for managing a plurality of requests within a data processing system of claim 10, and further comprising:
- a processor which executes system software that maintains a pending queue and an active queue for each of said plurality of peripheral devices, wherein each of said pending queues stores requests to be issued and each of said active queues stores requests that have been issued but have not completed;
- a peripheral adapter coupled between said processor and said peripheral bus;
- means for receiving a request at said system software which specifies a particular operation to be performed by said selected peripheral device;
- means for placing said request within a pending queue associated with said selected peripheral device;
- means for determining whether transmission of requests within said pending queue associated with said selected peripheral device has been halted;
- means for transmitting said request to said peripheral adapter in response to a determination that transmission of requests within said pending queue associated with said selected peripheral device has not been halted; and
- means for placing said request on an active queue associated with said selected peripheral device.

12. The system for managing requests within a data processing system of claim 11, wherein each of said means for reporting successful completion of said request to said requester comprises:
- means for transmitting an indication from said peripheral adapter to said system software that said request has been performed;
- means for removing said request from said active queue associated with said selected peripheral device; and
- means for resuming transmission of requests from each pending queue from which transmission of requests was halted.

13. The system for managing a plurality of requests within a data processing system of claim 8, wherein said peripheral adapter is a Small Computer System Interface (SCSI) adapter.

14. The system for managing a plurality of requests within a data processing system of claim 7, said data processing system including a plurality of processors, wherein said requestor comprises a particular one of said plurality of processors.

15. A program product stored on a media, wherein said program product can be utilized by a data processing system to manage a plurality of requests issued by a requester to selected peripheral devices among a plurality of peripheral devices coupled to a peripheral bus of said data processing system, said program product comprising:
- instruction means for transmitting a request issued by said requester to a selected peripheral device among said plurality of peripheral devices via said peripheral bus, wherein said request specifies a particular operation to be performed;
- instruction means for reporting successful completion of said request to said requestor via said peripheral bus in response to performance of said particular operation by said selected peripheral device within a first predetermined time period;
- instruction means for limiting access to said peripheral bus by said plurality of requests in response to a failure of said selected peripheral device to perform said particular operation within said first predetermined time period;
- instruction means for thereafter reporting a request timeout error to said requester in response to a failure of said selected peripheral device to perform said particular operation within a second predetermined time period;
- instruction means for reporting a successful completion of said request to said requester in response to performance of said particular operation by said selected peripheral device within said second predetermined time period, wherein request timeout errors due to peripheral bus saturation are minimized;
- wherein said instruction means for limiting access to said peripheral bus by said plurality of requests comprises instruction means for halting transmission of said plurality of requests to particular ones of said plurality of peripheral devices during said second predetermined time period; and
- instruction means for resuming transmission of said plurality of requests to said particular ones of said plurality of peripheral devices via said peripheral bus in response to performance of said particular operation by said selected peripheral device within said second predetermined time period or termination of said second predetermined time period.

16. The program product of claim 15, said data processing system further including a processor which executes system software that maintains a pending queue and an active queue for each of said plurality of peripheral devices, wherein each of said pending queues stores requests to be issued and each of said active queues stores requests that have been issued but have not completed, and a peripheral adapter coupled between said processor and said peripheral bus, said program product further comprising:
- instruction means for receiving a request at said system software which specifies said particular operation to be performed by said selected peripheral device;
- instruction means for placing said request within a pending queue associated with said selected peripheral device;
- instruction means for determining whether transmission of requests within said pending queue associated with said selected peripheral device has been halted;
- instruction means for transmitting said request to said peripheral adapter in response to a determination that transmission of requests within said pending queue associated with said selected peripheral device has not been halted; and
- instruction means for placing said request on an active queue associated with said selected peripheral device.

17. The program product of claim 16, wherein each of said instruction means for reporting successful completion of said request to said requestor comprises:
- instruction means for transmitting an indication from said peripheral adapter to said system software that said request has been performed;
- instruction means for removing said request from said active queue associated with said selected peripheral device; and instruction means for resuming transmission of requests from each pending queue from which transmission of requests was halted.

18. The program product of claim 15, wherein each of said plurality of peripheral devices within said data processing system is associated with a priority, and wherein said instruction means for halting transmission of said plurality of requests to particular ones of said plurality of peripheral devices during said second predetermined time period comprises instruction means for halting transmission of said plurality of requests to peripheral devices among said plurality of peripheral devices which have a higher priority than said selected peripheral device.

19. The program product of claim 18, said data processing system further including a processor which executes system software that maintains a pending queue and an active queue for each of said plurality of peripheral devices, wherein each of said pending queues stores requests to be issued and each of said active queues stores requests that have been issued but have not completed, and a peripheral adapter coupled between said processor and said peripheral bus, said program product further comprising:

instruction means for receiving a request at said system software which specifies a particular operation to be performed by said selected peripheral device;

instruction means for placing said request within a pending queue associated with said selected peripheral device;

instruction means for determining whether transmission of requests within said pending queue associated with said selected peripheral device has been halted;

instruction means for transmitting said request to said peripheral adapter in response to a determination that transmission of requests within said pending queue associated with said selected peripheral device has not been halted; and instruction means for placing said request on an active queue associated with said selected peripheral device.

20. The program product of claim 19, wherein each of said instruction means for reporting successful completion of said request to said requester comprises:

instruction means for transmitting an indication from said peripheral adapter to said system software that said request has been performed;

instruction means for removing said request from said active queue associated with said selected peripheral device; and instruction means for resuming transmission of requests from each pending queue from which transmission of requests was halted.

* * * * *

UNITED STATES PATENT AND TRADEMARK OFFICE
CERTIFICATE OF CORRECTION

PATENT NO. : 5,754,887
DATED : May 19, 1998
INVENTOR(S) : *Timothy M. Damron et al.*

It is certified that error appears in the above-identified patent and that said Letters Patent is hereby corrected as shown below:

In the Abstract, please change "vice" to --via--, in the sixth line of text.

In col. 3, line 23, please change "o" to --of--.

In col. 6, line 61, please change "53" to --56--.

Signed and Sealed this

Thirteenth Day of October 1998

Attest:

BRUCE LEHMAN

Attesting Officer

*Commissioner of Patents and Trademarks*